United States Patent
Scharstuhl et al.

(10) Patent No.: US 7,422,690 B2
(45) Date of Patent: Sep. 9, 2008

(54) FILTERING SYSTEM

(75) Inventors: Johan Jan Scharstuhl, Ambt-Delden (NL); Eric Scharstuhl, Enschede (NL)

(73) Assignee: Prime Water Systems GmbH, Bad Bentheim (DE)

( * ) Notice: Subject to any disclaimer, the term of this patent is extended or adjusted under 35 U.S.C. 154(b) by 364 days.

(21) Appl. No.: 10/471,935

(22) PCT Filed: Mar. 18, 2002

(86) PCT No.: PCT/NL02/00177

§ 371 (c)(1),
(2), (4) Date: May 7, 2004

(87) PCT Pub. No.: WO02/076590

PCT Pub. Date: Oct. 3, 2002

(65) Prior Publication Data

US 2004/0173532 A1 Sep. 9, 2004

(30) Foreign Application Priority Data

Mar. 23, 2001 (NL) .................................. 1017681

(51) Int. Cl.
*B01D 65/02* (2006.01)
(52) U.S. Cl. .................... 210/636; 210/257.2; 210/259; 210/321.69; 210/427; 210/650; 210/806
(58) Field of Classification Search ............ 210/257.2, 210/259, 266, 314–316, 321.88, 321.69, 210/321.89, 418, 420–427, 636, 650, 651, 210/806
See application file for complete search history.

(56) References Cited

U.S. PATENT DOCUMENTS

| 5,004,535 | A | * | 4/1991 | Bosko et al. .................... 210/90 |
| 5,589,066 | A | * | 12/1996 | Gray ........................... 210/258 |
| 5,895,573 | A | | 4/1999 | Scharstuhl ............. 210/321.87 |
| 6,120,688 | A | * | 9/2000 | Daly et al. ................... 210/650 |

(Continued)

FOREIGN PATENT DOCUMENTS

JP          60-68093        4/1985

(Continued)

OTHER PUBLICATIONS

International Search Report for PCT/NL02/00177 dated Oct. 7, 2002.

*Primary Examiner*—Joseph W Drodge
(74) *Attorney, Agent, or Firm*—Marshall, Gerstein & Borun LLP

(57) ABSTRACT

A filtering system comprising an inlet (11) for liquid to be filtered and an outlet (9) for filtered liquid, as well as filtering means, which system is characterized in that the filtering means, placed in series comprise: a first filter (2) comprising activated carbon with the capability to also remove particles that are larger than approximately 0.5 μm; an ultrafiltration membrane (5) for the removal of particles that are larger than approximately 0.02 μm; a post-treatment filter (14) of activated carbon, optionally provided with a microfiltration membrane (13), wherein the system also comprises a vessel (6) for filtered water located between the ultrafiltration membrane (5) and the post-treatment filter (14), with the option of using the filtered water from the vessel for back-flushing the ultrafiltration membrane (5).

14 Claims, 1 Drawing Sheet

U.S. PATENT DOCUMENTS 6,899,809 B2 * 5/2005 Scharstuhl et al. ....... 210/257.2
2001/0037964 A1 * 11/2001 Won et al. .................. 210/120

FOREIGN PATENT DOCUMENTS

| JP | 6-233981 | 8/1994 |
| JP | 8-24841 | 1/1996 |
| JP | 8-215678 | 8/1996 |
| JP | 10-328680 | 12/1998 |
| JP | 11-19486 | 1/1999 |
| JP | 11-309447 | 11/1999 |
| JP | 11-319827 | 11/1999 |
| JP | 2000-288539 | 10/2000 |
| WO | WO 99/47226 | 9/1999 |
| WO | WO 01/07151 | 2/2001 |

* cited by examiner

FILTERING SYSTEM

CROSS REFERENCE TO RELATED APPLICATIONS

This is the U.S. national phase application of International Application No. PCT/NL02/00177, filed Mar. 18, 2002, which claims the benefit of Dutch patent application No. 1017681, filed Mar. 23, 2001.

The present invention relates to a filtering system, in accordance with the preamble of claim 1. The invention also relates to a method of cleaning an ultrafiltration membrane module, which is part of the filtering system according to the invention.

A filtering system as mentioned in the preamble of claim 1 is known from Patent Abstracts of Japan, Vol. 2000, no. 2, 29 Feb. 2000 and JP 11.319827 A. Said known filtering system yields drinking water containing minerals and prevents backgrowth of bacteria from the outlet.

However, said known filtering system has a disadvantage in that the use of a nanofiltration membrane only provides a low flow rate through the filter. Therefore, much of the feed water is wasted in this process. Also, the water becomes stagnant in the module. Since inline cleaning is technically not possible in said known filtering system, bacteria and viruses may accumulate in the module, multiply and eventually pass teak spots in the membrane and the module connectors and contaminate the vessel for storage of filtered water.

The object of the present invention is to provide an improved system in which the above-mentioned drawbacks are eliminated. It is a particular object of the invention to provide a system in which drinking water may be produced without losing a great deal of water.

The present invention provides the advantage that the use of an ultrafiltration membrane makes a larger flow rate through the filter possible. Furthermore, so as to provide for a cleaning of said ultrafiltration membrane, the valve, which is provided between the first filter and the ultrafiltration membrane makes it possible that the ultrafiltration membrane is backwashed. Filtered water which is stored in the vessel flows back through the ultrafiltration membranes and removes any contamination which has been held back by the ultrafiltration membrane, after which said contaminants, together with the water, may be drained through the said valve and discarded.

The advantage to be obtained with the filter system of the present invention is that the ultrafiltration go membrane may be kept clean by backwashing said ultrafiltration membrane with sterile water from the vessel. Therefore, the ultrafiltration membrane does not have to be dismantled so as to have it cleaned.

Therefore, according to another aspect of the invention, it also relates to a method of cleaning the ultrafiltration membrane module, which is part of a system according to the invention, in accordance with claim 8.

As a matter of fact, reference is made to JP 11 309447 A (Patent Abstracts of Japan, Vol. 2000, no. 2, 29 Feb. 2000) in which an ultrafiltration membrane is mentioned, in the form of a hollow fibre membrane filter, capable of passing all minerals without any water loss. However, said reference does not mention a valve, which makes it possible to clean an ultrafiltration membrane by means of backwashing.

Also, reference is made to JP 60.068093 A (Patent Abstracts of Japan, Vol. 009, no. 200, 16 Aug. 1985), which mentions a method for filtering water, using an ultrafiltration membrane. However, said publication does not mention a valve according to the present invention, with which it is possible to clean the ultrafiltration membrane by means of backwashing.

Finally, reference is made to WO 01.07151 A (in the name of Prime Water Systems GmbH), which describes the use of an activated carbon filter, which is capable of removing particles that are larger then 0.5 µm, as a pre-filter to an ultrafiltration hollow fibre membrane filter. However, said publication does not mention the features of the present invention, such as the vessel for the storage of filtered water and the valve for making it possible to clean the ultrafiltration membrane by means of backwashing.

The advantage of the valve in the present invention is that the system can be used for filtering liquid when the valve is in the first position. When the valve is in the second position, filtered liquid can be flushed back from the vessel through the ultrafiltration membrane, in order to remove accumulated contamination from the pores. Via the valve, which is in the second position, the flushed-back filtered liquid (also indicated as back wash water) together with the contamination can subsequently be discharged to the drain.

The ultrafiltration membrane and the post-treatment filter may be interconnected by means of, for example, a tubing. In this tubing a connection may be provided for the vessel for filtered water. This connection for the vessel may consist of a branching leading from this connecting tubing.

As mentioned above, the ultrafiltration membrane is incorporated in a module. This ultrafiltration module preferably consists of a bundle of hydrophilic capillary membranes having an asymmetrical pore structure with the filtering layer on the inside of the capillary, as a result of which they have a very low flow resistance, and consequently a low pressure drop over the membranes. According to a preferred embodiment, the membranes are closed at one end and open at the other end, the space between the capillary membranes and the module wall being filled with epoxy resin. The water flows through the perforated wall of the module and the membrane wall to the lumen of the capillaries, and is thus filtered. Via the post-treatment filter the filtered water subsequently flows to the outlet or is fed to the vessel for filtered water. Such a dead-end ultrafiltration module is described, for example, in the American patent U.S. Pat. No. 5,895,573.

Another embodiment of the ultrafiltration module is one wherein the membranes are open at both ends, and wherein a valve is provided at one side through which the flow passes from the inside to the outside and wherein the filtered water exits through the side wall of the module. Such an embodiment may be called dead-end flush. The use of such a dead end flush module makes the above-mentioned method of cleaning the ultrafiltration membrane considerably more complicated.

If the ultrafiltration membrane has a pore size of approximately 0.02 µm, all the particles that are larger than this pore size will be retained. Among others, such a membrane will retain microorganisms such as bacteria and viruses, resulting in sterilised filtered water. Compounds that are dissolved in the water, such as minerals, will pass through the membrane. The original concentration of minerals is thus maintained. Due to the fact that the water is continuously swirling around the ultrafiltration module, there will be no stagnation in the module and the housing so that the risk of germ growth is minimised.

The first filter may be formed, for example, from a felt-like material in combination with activated carbon incorporated in the felt that is formed preferably by moulding. A favourable property of such a first filter module is that it does not, or only very slightly shed carbon, which might clog the ultrafiltration membrane. Moreover, this first filter of activated carbon provides a preliminary filtration up to approximately 0.5 μm. A final advantage of this first filter of activated carbon is that the flow resistance and consequently the pressure drop over the block will be reduced compared with other types of activated carbon filters.

In order to prevent the block of activated carbon from becoming clogged when the liquid to be filtered is more seriously contaminated with relatively large particles, and to prolong the life of the filtering device, the first filter comprises according to a preferred embodiment a first filtering step provided around the block of activated carbon, forming a supplementary filtering step before the block of activated carbon.

This first filtering step may be formed, for example, from a felt-like filter, optionally folded in concertina fashion around the block of activated carbon. These strips of such a first filtering step that are formed by the folds, possess a large filtering surface having a very considerable filtering capacity.

Such a filter is incorporated, for example, in a "801 series filter cartridge", available from Harmsco Industrial Filters of North Palm Beach, Fla., USA. A moulded block of activated carbon as mentioned above may consist of, for example, a "C-246 series moulded block filter cartridge", available from Fibredyne, of Dover, N.H., USA.

The back wash provision essentially consists of the valve between the first filter and the ultrafiltration membrane module. When said valve is in the second position, water will be allowed to flow from the pressure tank via the ultrafiltration module to the drain. The sterile water from the pressure tank (vessel for filtered water) will flow in the opposite direction compared with the direction of flow during filtration, through the ultrafiltration membrane, thereby cleaning its pore structure as well as the module housing. In this way contaminants retained by the membrane are flushed away.

The post-treatment filter is provided after the ultrafiltration membrane and the vessel for filtered water, but before the outlet. The filter consists of, for example, a cylindrical block of activated carbon, which may be extruded or sintered. A microfiltration module is disposed in the central passage through the block, extending parallel to the longitudinal axis. The water flows from the pressure tank through the block of activated carbon and subsequently through the microfiltration membranes. Any harmful organic compounds possibly still present in the water will be adsorbed on the activated carbon thereby allowing the taste to be further improved. The micro filtration membrane module at the inside of the block of activated carbon provides an effective barrier against back-growth of bacteria from the outlet into the pressure tank. The combination of ultrafiltration before the pressure tank, micro filtration module after the pressure tank, as well as regular washing of the ultrafiltration membrane module guarantees that the sterile water in the pressure tank is protected very effectively against bacterial contamination. In this way a very sterile system is provided.

The ultrafiltration membrane module may also be formed by a cylindrical block, which around its circumference is provided with openings for the inlet of water to be filtered. In this cylindrical block the filtration membranes may be provided, analogous to the first filter.

Below follows a description of the figures.

Figures 1, 2:
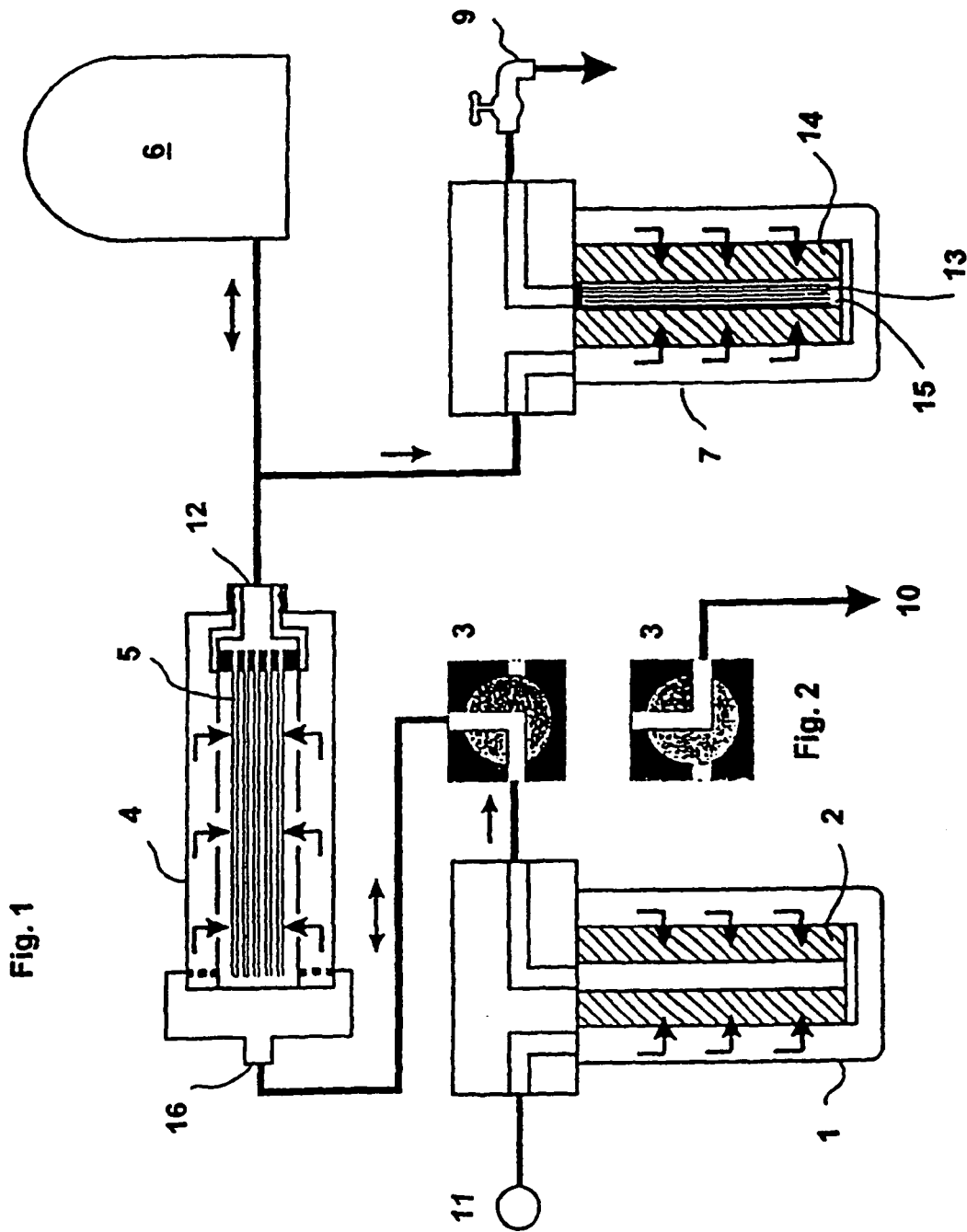
FIG. 1 shows a diagram of the filtering system according to the invention.
FIG. 2 shows a 3-way valve in a position to drain flush water from a membrane of the system to a drain.

The figure shows a housing 1 provided with an activated carbon first filter module 2 through which the water to be filtered is fed via an inlet 11. Such modules are known in practice. The pre-filtered water leaves this first housing 1 and is fed via a three-way valve to the housing 4 of the ultrafiltration membrane module 5. In the embodiment shown, the three-way valve 3 is in the first position, allowing the pre-filtered water from of the first filter housing 1 to be fed to the second housing 4. The housing 4 comprises the ultrafiltration membrane module 5. This ultrafiltration membrane module 5 is cylindrical. Such an embodiment is also known in the art. Subsequently the water from the ultrafiltration membrane module is fed via the outlet 12 to a vessel 6 for filtered water. This vessel 6 is embodied as a pressure tank. From the vessel 6 the filtered water can be fed via a post-treatment filter 14 in housing 7 to a faucet 9. The post-treatment filter 14 is preferably comprised of a cylindrical carbon filter having a coaxial cavity 15, in which coaxial cavity 15 a microfiltration membrane 13 is provided. This microfiltration module is preferably comprised of a bundle of hydrophilic membranes having an asymmetrical pore structure, with the filtering layer at the inside of the capillary, having a pore size of approximately 0.1 to approximately 0.4 μm.

Because there is a microfiltration membrane 13 between the faucet 9 and the storage vessel 6 for filtered water, no back-growth of contaminants via the faucet 9 to the storage vessel 6 is possible. This guarantees the sterility of the filtered water in the vessel 6.

When the ultrafiltration membrane 5 becomes contaminated due to the retention of substances that have been removed from the water to be filtered, filtered water can be flushed back from the vessel 6 through the ultrafiltration membrane and subsequently to a drain 10. This drain 10 can be reached by setting the three-way valve 3 into a second position as shown in FIG. 2. When flushing back, the faucet 9 must of course be closed. By positioning the three-way valve 3 as near as possible to the feed side 16 of the housing 4 of the ultrafiltration module 5, and at the same time keeping the distance from the outlet 12 to the vessel 6 for filtered water as short as possible, only very little water will be required for cleaning the ultrafiltration membrane module 5 in accordance with the procedure described above.

The above-described sequence of separate filtering means, three-way valve and storage vessel, between the inlet and the outlet of the system provides a very convenient system for the purification of drinking water.

The invention is of course not limited to the illustrations in the figures and the above description. A person skilled in the art will know of further adaptations.

The invention claimed is:

1. A filtering system comprising:
an inlet for liquid to be filtered, an outlet for filtered liquid, and filtering means, placed as modules in series,
the filtering means comprising:
a first filter comprising activated carbon to provide a primary filtration of up to approximately 0.5 μm,
an ultrafiltration membrane having a pore size of approximately 0.02 μm,
a valve disposed between the first filter and the ultrafiltration membrane, or disposed between housings in which the first filter and the ultrafiltration membrane are accommodated, the valve in a first position connecting the first filter with the ultrafiltration membrane, and in a second position connecting the ultrafiltration membrane with a drain for discharging contaminant from the ultrafiltration membrane via said valve;
a post-treatment filter comprising activated carbon with a microfiltration module that is connected to the outlet; and a storage vessel for filtered water disposed between the ultrafiltration membrane and the post-treatment filter, said filtered water backwashing the ultrafiltration membrane when the valve is in the second position.

2. A system according to claim 1, wherein each of the first filter, the ultrafiltration membrane and the post-treatment filter is accommodated in a separate housing.

3. A system according to claim 1, wherein the ultrafiltration membrane comprises a dead-end configuration.

4. A system according to claim 1, wherein the ultrafiltration membrane comprises a dead-end flush configuration.

5. A system according to claim 1, wherein the ultrafiltration membrane comprises hydrophilic capillary membranes having an asymmetrical pore structure with a filtering layer on the inside of the capillary membranes.

6. A system according to claim 1, wherein the post-treatment filter comprises a cylindrical block of activated carbon having a substantially coaxial open cavity, the microfiltration module being provided in the open cavity.

7. A system according to claim 6, wherein the microfiltration module comprises hydrophilic capillary membranes having an asymmetrical pore structure with a filtering layer on the inside of the capillary membranes.

8. A system according to claim 1, wherein the valve is a three-way valve.

9. A method of operating a filtering system comprising an inlet for liquid to be filtered, an outlet for filtered liquid, and filtering means, placed as modules in series, the filtering means comprising a first filter comprising activated carbon to provide a primary filtration of up to approximately 0.5 $\mu$m, an ultrafiltration membrane having a pore size of approximately 0.02 $\mu$m, a valve disposed between the first filter and the ultrafiltration membrane, or disposed between housings in which the first filter and the ultrafiltration membrane are accommodated, the valve in a first position connecting the first filter with the ultrafiltration membrane, and in a second position connecting the ultrafiltration membrane with a drain, a post-treatment filter comprising activated carbon with a microfiltration module that is connected to the outlet; and a storage vessel for filtered water disposed between the ultrafiltration membrane and the post-treatment filter, the method comprising:

closing the outlet;

conducting, in counterflow, filtered water from the storage vessel with the valve in the second position to remove contamination from the membrane; and subsequently draining water with the contamination from the ultrafiltration membrane via the valve through the drain.

10. The method according to claim 9, comprising:

passing water through a first filter of activated carbon to provide a primary filtration of up to approximately 0.5 $\mu$m, then through an ultrafiltration membrane module having a pore size of approximately 0.02 $\mu$m, then through a post-treatment filter comprising activated carbon; and discharging the thus filtered water via an outlet.

11. The method according to claim 10, comprising collecting the water in a storage vessel after the water passes through the ultrafiltration membrane module.

12. The method according to claim 11, comprising passing the water from the storage vessel through the post-treatment filter comprised of activated carbon to the outlet.

13. The method according to claim 10, comprising passing the water through the ultrafiltration module at a rate of between 0.2 to 20 liters per minute.

14. The method according to claim 9, wherein the valve is a three-way valve.

* * * * *